United States Patent
Klein et al.

[11] 3,899,390
[45] Aug. 12, 1975

[54] MEASURING APPARATUS FOR THE COOLANT OUTLET TEMPERATURE IN NUCLEAR-REACTOR FUEL ELEMENTS

[75] Inventors: Klaus-Wilhelm Klein, Erlangen; Peter Rau, Mittelehrenbach, both of Germany

[73] Assignee: Siemens Aktiengesellschaft, Munich, Germany

[22] Filed: June 12, 1972

[21] Appl. No.: 261,656

[30] Foreign Application Priority Data
June 14, 1971  Germany............................ 2129438

[52] U.S. Cl...................... 176/19 R; 176/66; 176/87
[51] Int. Cl............................................. G21c 17/02
[58] Field of Search ............. 176/66, 68, 19, 20, 26, 176/87

[56] References Cited
UNITED STATES PATENTS

| | | | |
|---|---|---|---|
| 3,036,965 | 5/1962 | Braun .................................. | 176/68 |
| 3,060,111 | 10/1962 | Sherman et al. .................. | 176/19 R |
| 3,151,030 | 9/1964 | Taylor............................... | 176/20 R |
| 3,234,100 | 2/1966 | Ogle................................... | 176/19 R |
| 3,354,040 | 11/1967 | Frame et al. ....................... | 176/19 R |
| 3,365,366 | 1/1968 | Cundill.............................. | 176/20 R |
| 3,510,396 | 5/1970 | Winkler et al. .................... | 176/20 R |

Primary Examiner—Leland A. Sebastian
Assistant Examiner—Roger S. Gaither
Attorney, Agent, or Firm—Kenyon & Kenyon Reilly Carr & Chapin

[57] ABSTRACT

A measuring apparatus for the coolant outlet temperature in nuclear reactor fuel elements particularly gas cooled fast breeder reactors is disclosed. The apparatus comprises a fuel element adapted to permit internal flow of coolant over the individual fuel elements with a variable choke adapted to regulate coolant flow rate. The temperature of the coolant after it passes over the fuel rods is measured by a temperature sensor which is removably mounted in an internal guide tube which passes through the fuel element and its supporting structure.

3 Claims, 3 Drawing Figures

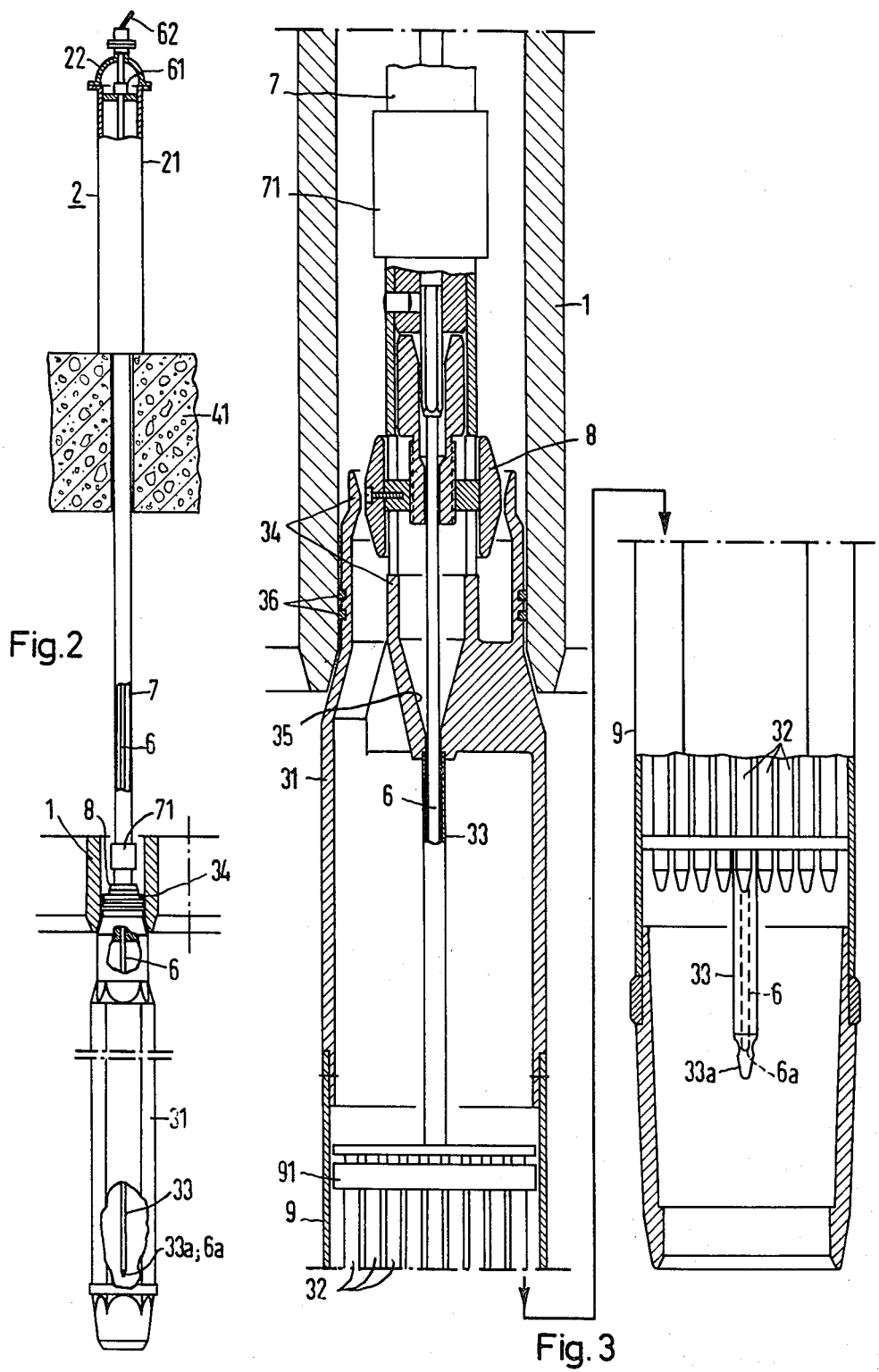

MEASURING APPARATUS FOR THE COOLANT OUTLET TEMPERATURE IN NUCLEAR-REACTOR FUEL ELEMENTS

BACKGROUND OF THE INVENTION

1. Field of the Invention

The present invention is concerned with an apparatus for measuring the coolant outlet temperature in the fuel and breeder elements of nuclear reactors, and more particularly of fast gas-cooled nuclear reactors.

2. Description of the Prior Art

In view of the high power density of fast nuclear reactors it is necessary that particular attention be given to the uniform cooling of the fuel elements to thereby reliably prevent overloads and damage to the fuel elements. In order to monitor the uniform heat removal, it is no longer sufficient, as in thermal nuclear core reactors, to measure the coolant discharge temperature at the reactor. Rather, it is necessary to determine the coolant outlet temperature at each individual fuel, or breeder, element. Such measuring devices, particularly in the case of fast gas-cooled reactors must, however, be attached to the reactors in such a manner that they disturb as little as possible the very high coolant flow rate. Furthermore, not only should the measuring devices together with their electrical leads form an inexpensive structure, but they should be replaceable during the continuing operation of the reactor.

SUMMARY OF THE INVENTION

According to the invention, this object is achieved by a guide tube arranged in the central zone of the fuel element for receiving a previously known temperature sensor, which is inserted through a corresponding tubular member within the attachment mechanism of the fuel element. Further the device can also be replaced during the operation of the reactor. Thermocouples may be used as the temperature sensors as well as optical temperature measurement through the straight guide tube. It is, of course, possible to introduce several thermocouples through this guide tube and to evaluate their signals by the well-known two-out-of-three principle.

BRIEF DESCRIPTION OF THE DRAWINGS

An embodiment for suspended fuel elements of a fast gas-cooled breeder reactor will now be explained in detail with reference to the following drawings in which:

FIG. 2 illustrates the arrangement of the temperature measuring apparatus with its associated supporting devices for an individual fuel element embodying the invention.

FIG. 3 illustrates a cross-sectional view of a fuel element with the temperature sensor embodying the invention arranged therein.

DESCRIPTION OF THE PREFERRED EMBODIMENT

Figure 1:
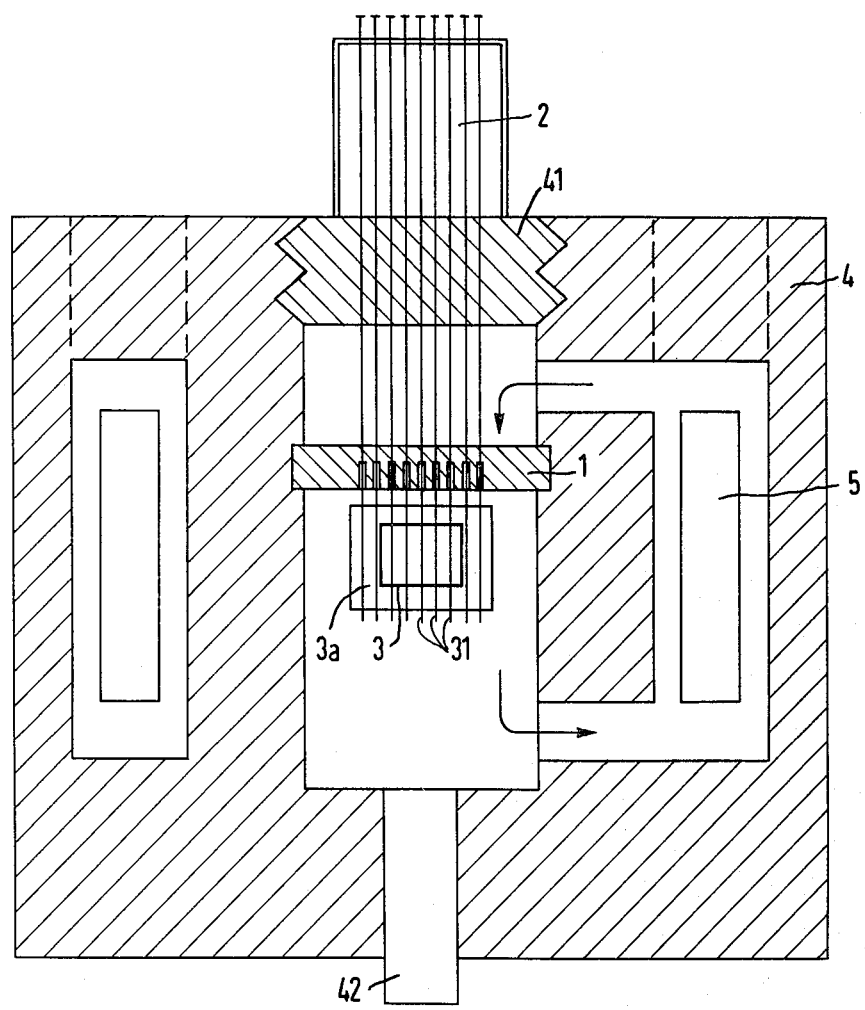
FIG. 1 illustrates a schematic cross-sectional view through a core reactor embodying an installation of the invention.

The nuclear reactor chosen to illustrate the present invention is housed in a steel-concrete pressure tank 4 and consists of the reactor core 3 and the breeder mantle 3a. The reactor fuel elements 31 are suspended from support plate 1 with their lower ends free so that the hot coolant stream, the temperature of which is to be measured, can flow unobstructed out of the lower portion thereof. The steel-concrete tank 4 is closed by means of cover 41, through which the support devices of the individual fuel elements pass. Above cover 41 are located attachment members 2 for the fuel elements as well as the feedthroughs for the temperature measuring devices of each individual fuel element.

In the pressure tank 4 heat exchangers 5 are grouped in the normal manner around the nuclear reactor. These heat exchangers 5 serve, for example, to generate steam for the turbines or for heating the working gas for the gas turbines. The cooling medium for reactor core 3 flows from the top downward through the fuel elements 31 in the direction of the arrow as indicated. This, for example, may be helium gas. The blowers required for the circulation of the gas are not shown for the sake of simplicity.

To replace the fuel elements 31 a replacement device 42 is provided in the lower part of the reactor pressure tank 4. As the construction of this device is of no importance to the present invention, it is not shown in detail. In order to replace the fuel elements with this device, the connection between the attachment mechanism 2 and the fuel elements 31, connected to each other by coupling 71 shown in FIGS. 2 and 3, is disengaged without the necessity of opening the cover 41. This coupling 71 can be formed from known connectors, such as ratchets or bayonet locks, which operate in conjunction with corresponding parts in the fuel element support linkage 7 disposed between the attachment device 2 and the fuel element support plate 1.

FIG. 2 shows in schematic form the mutual relation of the above-mentioned parts. In this connection it should be mentioned that each fuel element 31 is equipped with a choke 8 on the coolant entrance side within the head 34 of each fuel element 31. The choke 8 is adjustable through the support linkage 7 and is adjusted as a function of the measured outlet temperatures by means of the motorized drives provided in the fuel element attachment device 2. The fuel elements 31 illustrated in this exemplary embodiment are of hexagonal cross-section, which permits the closest possible packing of the fuel rods within the reactor core. In principle, however, other cross-sectional shapes are also possible.

FIG. 3 shows a longitudinal cross-sectional view through a fuel element 31 of this type having a multiplicity of parallel, adjacent individual fuel rods 32 arranged within the hexagonal box 9. These are fixed in their spatial configuration in the normal manner by spacers and are suspended at rod support plate 91. The head 34 of the fuel element 31 is connected to the coupling 71 and the attachment device or support linkage 7. The previously mentioned adjustable choke 8, can be adjusted, for example, by an externally operable spindle to thereby change the cross-sectional area of the coolant entrance. In the interior of the fuel element a guide tube 33 is located for guiding the thermocouples through the fuel element. The guide tube 33 is perforated at its lower end at the point 33a to permit the coolant to directly contact the measuring head 6a of the thermocouple mechanism. The head 34 of the fuel element is sealed against the support plate by piston rings 36 and is conically expandable in the interior 35, so that the thermocouple tube 6, which can be inserted through the tubular channel in the attachment device, can be introduced with little resistance into the guide tube 33. In the interior of this thermocouple tube 6 the leads to one or several thermo elements are located and are connected at the lower end 6a of this tube with the latter thermo elements to form the temperature sensor.

As is shown in FIG. 2, the thermocouple tube 6 passes through the interior of the fuel element support rod 7 as well as the coupling and choke adjustment linkage. Above the fuel element attachment devices, which are enclosed in a pressure-tight manner in tube 21, a pressure-tight connection is established with the measuring cables 62 leading to the outside. A pressure-tight and gas-tight terminal is provided by cap 22, which provides additional safety against the possibility that cooling gas might escape through the seal of the thermocouple tube 6 within the housing 21.

This arrangement of the thermo elements and of other temperature measuring devices, provides not only a structurally simple device, but also offers the possibility of replacing damaged thermo elements or other measuring devices, during the operation of the reactor. Further by this invention it is possible to break down the defective thermo element tubes 6 into shorter sections by simple means during withdrawal of the tubes. This thereby simplifies the removal of these parts, which may have become radioactive after extended irradiation. It should be also remarked that in lieu of temperature measurement by means of thermocouples or resistance thermometers an optical measurement through the straight central canal of the fuel element as well as of the drive or attachment devices would also be possible. If the thermocouple tubes 6 are made flexible, it would also be possible to use them in guide canals that are not straight, in the event that the reactor design makes this necessary. A flexible design of the thermocouple tubes 6 would also be advantageous for easier transportation, for example, on drums, as well as in reducing the working space in the reactor building.

In conclusion it should further be pointed out that in the event that the fuel elements are to be changed, the temperature measuring device, i.e., the thermocouple tube 6, is first withdrawn, and can be re-used at the same installation site after the new fuel element is inserted. In this respect it is particularly advantageous to mount the connections of the thermocouples with the measuring lines, external to the reactor. This may be accomplished, for instance, by using terminals or jacks, above the attachment device 2 at point 61 to thereby make them accessible at anytime during the operation of the reactor.

As was already mentioned, while this arrangement is suited to the measurement of the coolant outlet temperature, it is of course, also useful for other design principles of nuclear reactors, as well as for other coolants and coolant streams.

In the foregoing, the invention has been described in reference to specific exemplary embodiments. It will be evident, however, that variations and modifications, as well as the substitution of equivalent constructions and arrangements for those shown for illustration, may be made without departing from the broader scope and spirit of the invention as set forth in the appended claims. The specification and drawings are accordingly to be regarded in an illustrative rather than in a restrictive sense.

What is claimed is:

1. A nuclear reactor having a fluid pressure chamber in which a fuel element is suspended by a tubular attachment rod extending from the outside of said chamber downwardly to its inside, said element having an attachment head to which the lower end of said rod is attached and said head having a passage extending downwardly therethrough and aligned with the inside of said rod, and from which head an elongated enclosure depends and wherein spaced below said head and within said enclosure a fuel rod support plate is positioned from which a multiplicity of fuel rods depend, said head forming a coolant inlet for said enclosure and the enclosure's bottom end being open for downward flow of coolant therethrough; a guide tube having an inside aligned with the lower end of said head's passage and depending from said head through said support plate and said fuel rods to below the lower ends of the fuel rods, said guide tube having a bottom end positioned within said downward flow of coolant, means for transmitting information about said coolant at said guide tube's bottom end extending upwardly through said guide tube and said attachment head and said attachment rod to the outside of said fluid pressure chamber which transmitting means can be slidably inserted into and withdrawn from said chamber, and means for preventing the escape of fluid from said pressure chamber via said guide tube, attachment head and attachment rod.

2. The reactor of claim 1 in which said information transmitting means is an electrically responsive element mounted by a conductor tube extending from said bottom end of the guide tube upwardly through said guide tube and said attachment head and said attachment rod to the outside of said fluid pressure chamber, said guide tube's bottom end being perforated to give said downward flow of coolant access to said electrically responsive element.

3. The reactor of claim 1 having a flow-control choke for said coolant inlet and which is provided with an adjustment means through which said passage extends.

* * * * *